(12) United States Patent
Wagner et al.

(10) Patent No.: US 8,970,074 B2
(45) Date of Patent: Mar. 3, 2015

(54) ELECTRIC MOTOR AND METHOD OF COOLING

(75) Inventors: Jon Wagner, Belmont, CA (US); Mark Sherwood, San Francisco, CA (US); Paul Karplus, Orinda, CA (US)

(73) Assignee: Mission Motor Company, San Francisco, CA (US)

( * ) Notice: Subject to any disclaimer, the term of this patent is extended or adjusted under 35 U.S.C. 154(b) by 424 days.

(21) Appl. No.: 13/287,069

(22) Filed: Nov. 1, 2011

(65) Prior Publication Data

US 2012/0104884 A1 May 3, 2012

Related U.S. Application Data

(60) Provisional application No. 61/409,011, filed on Nov. 1, 2010.

(51) Int. Cl.
*H02K 9/00* (2006.01)
*H02K 9/19* (2006.01)
*H02K 1/32* (2006.01)
*H02K 5/20* (2006.01)
*H02K 7/00* (2006.01)

(52) U.S. Cl.
CPC .. *H02K 9/19* (2013.01); *H02K 1/32* (2013.01); *H02K 5/20* (2013.01); *H02K 7/003* (2013.01)
USPC ............................................. 310/54; 310/59

(58) Field of Classification Search
USPC .................................................. 310/52–59
See application file for complete search history.

(56) References Cited

U.S. PATENT DOCUMENTS

| | | | | |
|---|---|---|---|---|
| 3,488,532 A * | 1/1970 | Anderson et al. | | 310/58 |
| 3,629,628 A * | 12/1971 | Rank et al. | | 310/54 |
| 3,659,125 A * | 4/1972 | Basel | | 310/54 |
| 3,816,780 A * | 6/1974 | Smith et al. | | 310/52 |
| 3,882,355 A | 5/1975 | Fries | | |
| 4,137,472 A | 1/1979 | Workman et al. | | |
| 4,409,502 A | 10/1983 | McCabria | | |
| 5,140,204 A | 8/1992 | Cashmore et al. | | |
| 6,087,744 A * | 7/2000 | Glauning | | 310/58 |
| 6,844,637 B1 | 1/2005 | Smith et al. | | |
| 6,879,069 B1 | 4/2005 | Weidman | | |
| 6,897,581 B2 * | 5/2005 | Doherty et al. | | 310/52 |
| 6,927,516 B2 * | 8/2005 | Furuse | | 310/90 |
| 7,456,536 B2 | 11/2008 | Tanaka | | |
| 7,489,057 B2 | 2/2009 | Zhou | | |
| 7,701,096 B2 * | 4/2010 | Noda et al. | | 310/57 |
| 2006/0055255 A1 * | 3/2006 | Hattori et al. | | 310/58 |
| 2007/0228847 A1 | 10/2007 | Kim | | |
| 2007/0273219 A1 * | 11/2007 | Shimada | | 310/52 |
| 2008/0030086 A1 * | 2/2008 | Noda et al. | | 310/57 |

(Continued)

*Primary Examiner* — Thanh Lam
(74) *Attorney, Agent, or Firm* — Jeffrey Schox; Diana Lin

(57) ABSTRACT

A system for cooling an electric motor, the electric motor including a stator disposed about a rotor, wherein cooling system includes a rotor assembly including a shaft with a shaft channel extending through the center of the shaft and radial channels extending radially from the shaft channel; a rotor with profiled rotor ends; and two guides, each coupled to a rotor end, that guides fluid from the shaft exterior to the rotor end. The system may additionally include interior channels that traverse through the rotor interior, wherein the interior channels fluidly couple the radial channels to a guide-rotor end pair. The system may also include stator cooling mechanisms, including cooling channels within the motor casing proximal to stator exterior surface and dispensing mechanisms that dispense working fluid to the stator coils.

16 Claims, 10 Drawing Sheets

(56) References Cited

U.S. PATENT DOCUMENTS

| | | | |
|---|---|---|---|
| 2009/0184592 A1* | 7/2009 | Sano et al. ............ 310/59 |
| 2010/0038981 A1 | 2/2010 | Urano et al. |
| 2010/0194220 A1 | 8/2010 | Tatematsu |

* cited by examiner

FIGRE 6A

ELECTRIC MOTOR AND METHOD OF COOLING

CROSS-REFERENCE TO RELATED APPLICATIONS

This application claims the benefit of U.S. Provisional Application No. 61/409,011, filed 1 Nov. 2010, which is incorporated in its entirety by this reference.

TECHNICAL FIELD

This invention relates to the electric motor field, more specifically to the electric motor thermal regulation field.

BACKGROUND

Electric motors of various types are commonly used in industrial, commercial, and consumer applications, ranging from the driving of a pump to the propulsion of an electric vehicle. An AC Induction type motor includes a rotor with conducting rods disposed within a stator with multiple conducting coils, wherein the rotor rods respond to changes in a magnetic field generated by the stator coils and cause torque on the rotor. In a permanent magnet type motor, the rotor includes steel and magnets, wherein the rotor magnets respond to the magnetic field generated by the stator coils and induce torque on the rotor. In a switched reluctance or synchronous reluctance motor, the steel in the rotor responds to the magnetic field generated by the stator coils and induces torque on the rotor. This electromagnetic interaction heats the motor through resistive heating due to currents in the rotor rods and stator coils, hysteresis losses due to changing magnetic fields in the steel, and resistive heating due to the eddy currents generated due to magnetic fields in the steel. Additionally, friction from the motor's moving components also generate heat. This heat may contribute to motor inefficiencies, malfunction, and failures. Therefore, there is a need for a motor configuration that allows the motor, more specifically the rotor, stator, and stator coils to be cooled.

BRIEF DESCRIPTION OF THE FIGURES

FIGS. 6A and 6B are a perspective view of a second embodiment of the cooling system and a schematic representation of a cooling path through the second cooling system embodiment, respectively.

DESCRIPTION OF THE PREFERRED EMBODIMENTS

The following description of the preferred embodiment of the invention is not intended to limit the invention to these preferred embodiments, but rather to enable any person skilled in the art to make and use this invention.

Electric Motor

Figure 1:
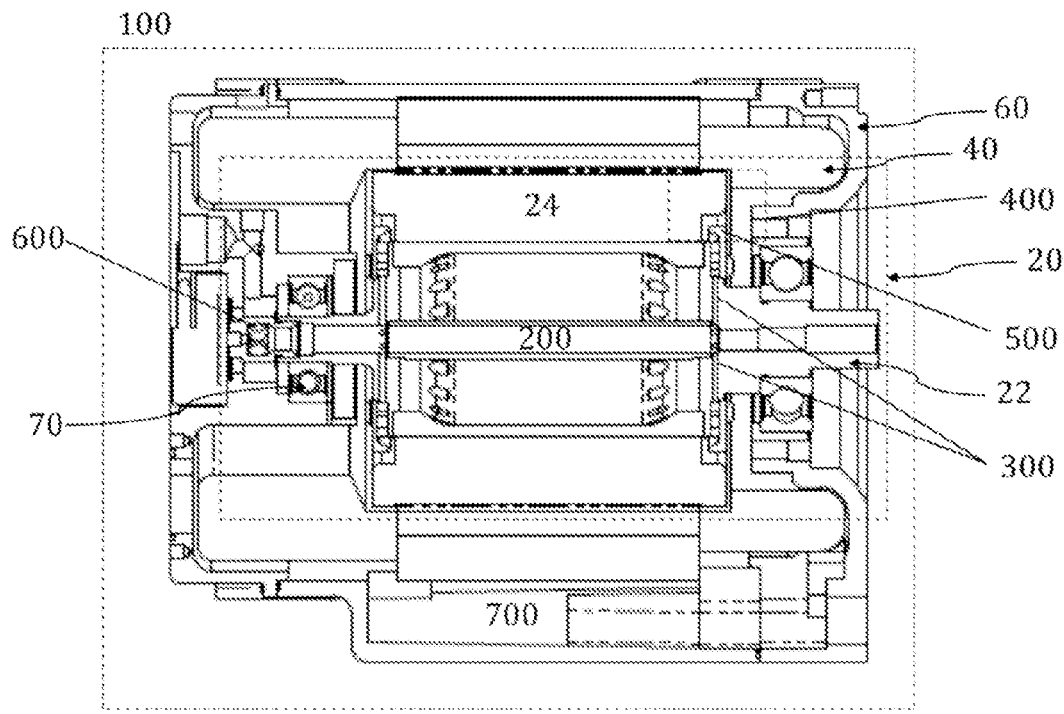
FIG. 1 is a schematic representation of the cooling system.
Figure 2:
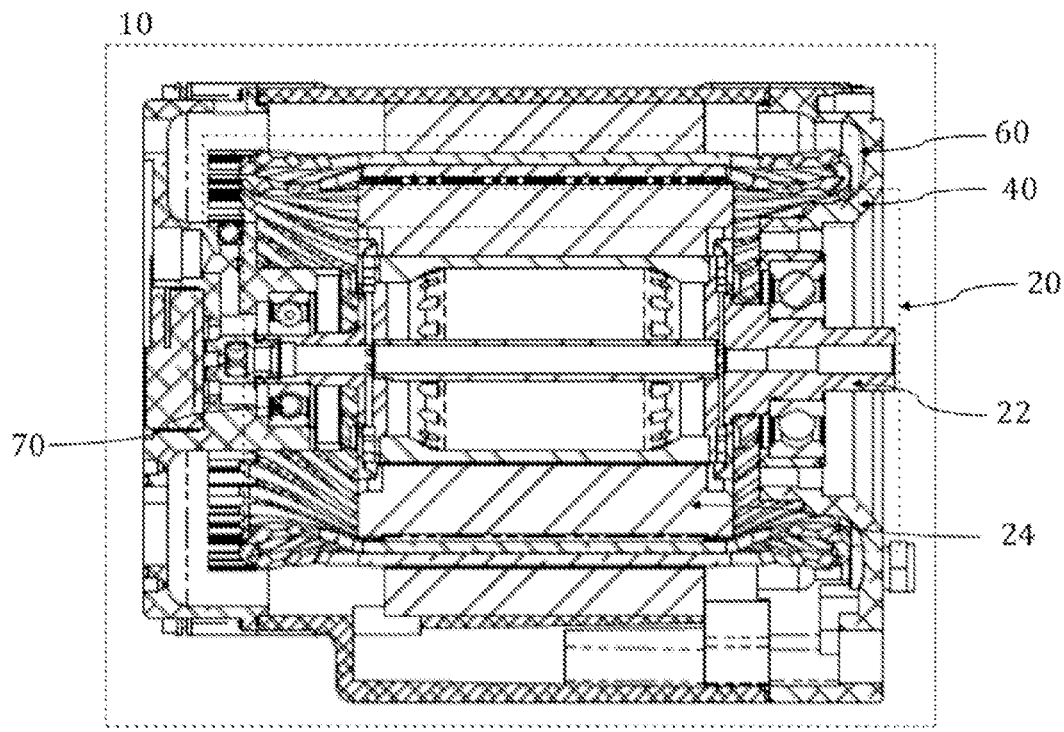
FIG. 2 is a schematic representation of a motor cooled by the cooling system.

As shown in FIG. 1, the system for cooling an electric motor 100 includes a stator 40 including stator coils, a rotor assembly 20, the rotor assembly including a shaft 22 rigidly coupled to a rotor 24, and a guide 500. The shaft 22 includes a shaft channel 200 and radial channels 300. The rotor includes a profiled rotor end 400 configured to facilitate fluid dispersion from the shaft to the stator coils. In operation, the stator 40 drives rotation of the rotor assembly 20. The motor 10 may additionally include a motor casing 60 enclosing the stator 40 and rotor assembly 20. The motor 10 may additionally include a rotor position sensor, such as an encoder, resolver, or Hall effect sensor. The motor 10 is preferably an AC induction motor or a permanent magnet synchronous AC motor, but may alternatively be a switched reluctance motor, synchronous reluctance motor, DC brushless motor, DC coreless motor, DC brushed motor, or any motor with a rotor.

As shown in FIG. 1, this motor configuration provides a substantially continuous cooling path through the motor 10 that allows a single volume of working fluid to consecutively cool multiple motor components, preferably without the use of intermediary displacement devices (e.g. pumps). More specifically, the motor configuration allows both the rotor assembly 20 and the stator 40 to be cooled with the same volume of working fluid. The working fluid is preferably directed through the rotor assembly interior to the rotor end, and from the rotor end to adjacent stator coils. Fluid flow from the rotor end to the stator coils is preferably enabled and controlled by the rotor end configuration, wherein the working fluid is drawn up the rotor end and dispersed to the stator coils by centrifugal force. The rotor end geometry preferably controls the angle of dispersion. In one specific embodiment, the working fluid is directed through shaft interior by the shaft channel 200, from the shaft channel 200 to the rotor end 400 by the radial channels 300, and off the rotor end 400 to the stator coils 40.

The motor 10 is configured to cool the motor components with a working fluid. The working fluid ("coolant") functions to cool the rotor assembly 20, and may also cool the stator 40. The working fluid may additionally function to lubricate the moving parts of the motor. The working fluid preferably has a high thermal capacity, low viscosity, and high lubricity. The working fluid is preferably hydrophobic, but may alternatively be hydrophilic. The working fluid is preferably transmission oil, but may alternatively be engine oil, clutch oil, coolant, water, air, or any other suitable fluid. In operation, the working fluid preferably fills all fluid channels of the cooling system, but may alternatively fill only a portion of the cooling system fluid channels.

Figure 4A:
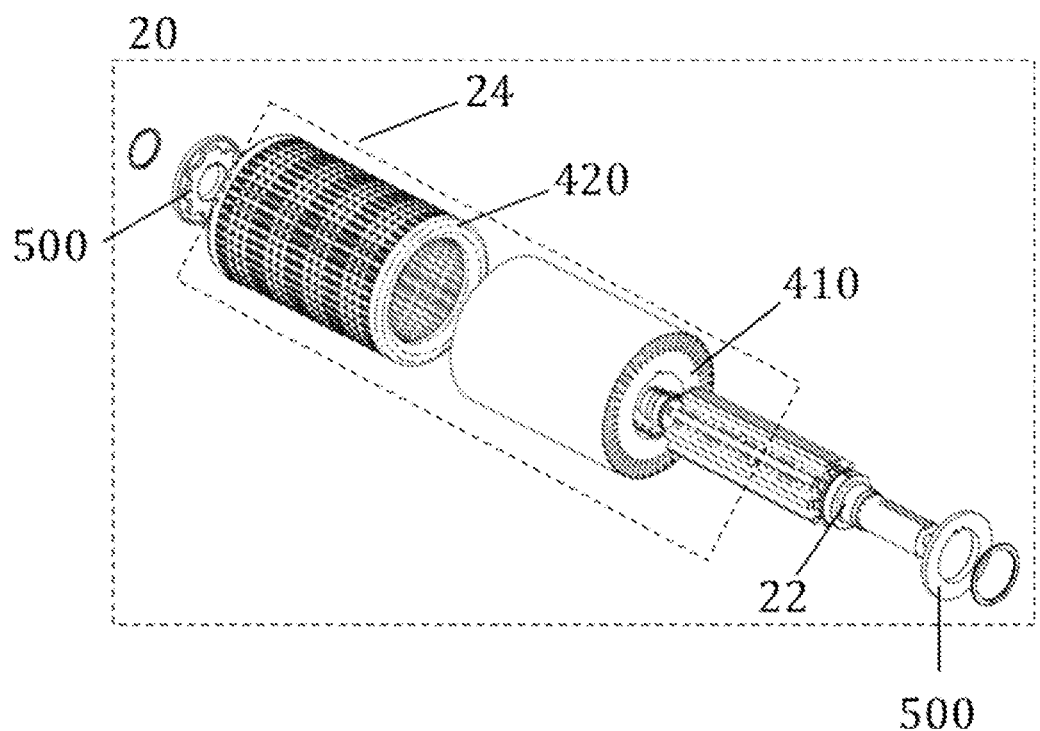
FIGS. 4A, 4B and 4C are an exploded view of an embodiment of a rotor assembly, a perspective view of an embodiment of the shaft, and a cross-sectional view of the shaft embodiment coupled to a rotor, respectively.

As shown in FIG. 4A, the rotor 24 of the motor functions to rotate in response to changes in the magnetic field of the stator 40, and to induce torque in the shaft 22. The rotor 24 ("armature") includes rotor windings surrounding rotor steel. The rotor windings preferably include a plurality of sheets, wound wires, or bars coupled together along the ends by circular end-pieces. The end-pieces are preferably substantially toroidal, such that the transition between the inner radial portion and the outer radial portion is curved. However, the end-pieces may have a sharp transition, such that the end-piece face normal to the plane of the end-piece may be flat (e.g. the end-piece is a cylindrical ring) or angled. The rotor bars and end-pieces may be a substantially continuous piece if the rotor is die-cast, but may alternatively be separate pieces if the rotor is fabricated, wherein the end-pieces are joined to the rotor bars by a thermal or mechanical junction (e.g. brazed, welded, screwed, etc.). The rotor windings are preferably made of copper, but may alternatively be made of aluminum, copper alloy, gold, or any conductive material. The rotor steel is preferably substantially cylindrical, with flat end faces. The rotor steel preferably additionally includes slots along the circumference that accommodate the rotor bars, wherein the slots preferably extend along the rotor steel length. The rotor steel preferably includes a channel extending concentrically through the rotor steel center ("rotor interior surface") that accommodates a shaft 22. The rotor interior surface may additionally include features, such as teeth (e.g. extending along the rotor length), threads, grooves, clips, or any other suitable feature that enables mechanical coupling of the shaft 22 to the rotor interior surface.

The shaft 22 of the rotor assembly functions to rotate in response to the torque generated by the rotor. The shaft 22 preferably extends the length of the rotor 24, and more preferably extends further than the rotor 24. The shaft 22 may couple to a transmission, wherein the shaft functions to utilize the torque generated by the rotor 24 to drive the transmission. The working fluid that cools the rotor assembly may additionally function to cool the transmission, wherein the fluid flows through the shaft to the transmission. The shaft 22 is preferably a substantially continuous cylindrical piece, and is preferably dimensioned to couple within the rotor interior. The shaft 22 may additionally include shaft features, such as fins, threads, grooves, clips, or any other suitable feature that enables mechanical coupling of the shaft to the rotor interior surface. The shaft 22 includes the shaft channel 200 and radial channels 300 of the cooling system, and may additionally cooperatively define interior channel(s) 350 with the rotor interior surface.

Figure 4B:
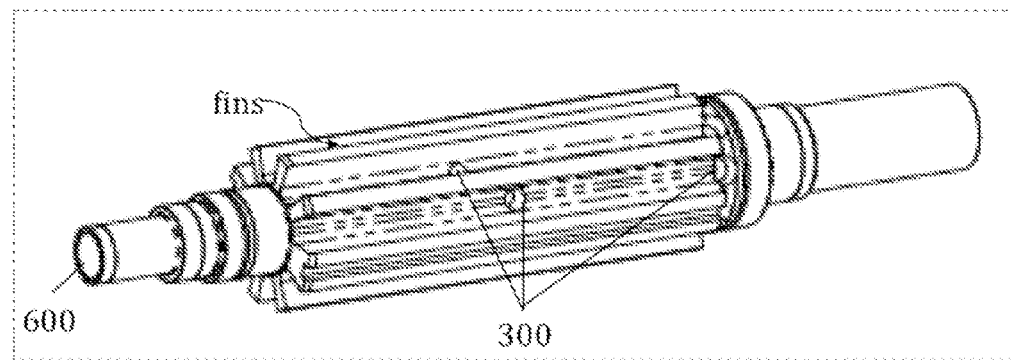
Figure 4C:
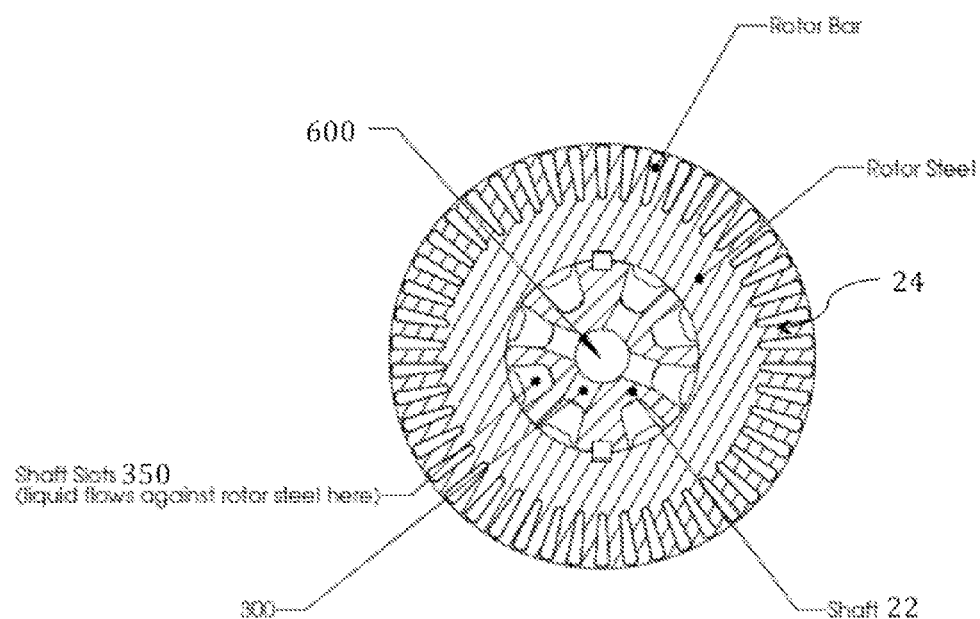

The rotor 24 is preferably press-fit onto the shaft 22 during assembly, but may alternatively be screwed (e.g. the shaft exterior and rotor interior surface are threaded and couple to each other), snap-fit (e.g. a circumferential protrusion from the shaft snaps into a groove in the rotor interior surface), coupled by screws, bolted, welded, or formed as a singular piece during construction. In one specific embodiment, the shaft 22 includes a plurality of fins evenly distributed about the shaft circumference (as shown in FIG. 4B). The rotor interior surface includes a plurality of teeth complimentary to the shaft fins. The rotor 24 is press-fitted to the shaft 22. The gaps between the rotor teeth and the shaft fins are preferably controlled, such that the rotor and shaft fins cooperate to form interior channels 350 therebetween (as shown in FIG. 4C). In a second embodiment, the shaft exterior is threaded (e.g. as a male screw thread) and the rotor interior surface includes a complimentary threading (e.g. as a female screw thread) of substantially the same pitch. The shaft 22 preferably screws into the rotor 24, and preferably forms an interior channel 350 therebetween that spirals about the shaft 22. However, any suitable arrangement and method of coupling may be used to form the rotor assembly 20.

Figure 7A:
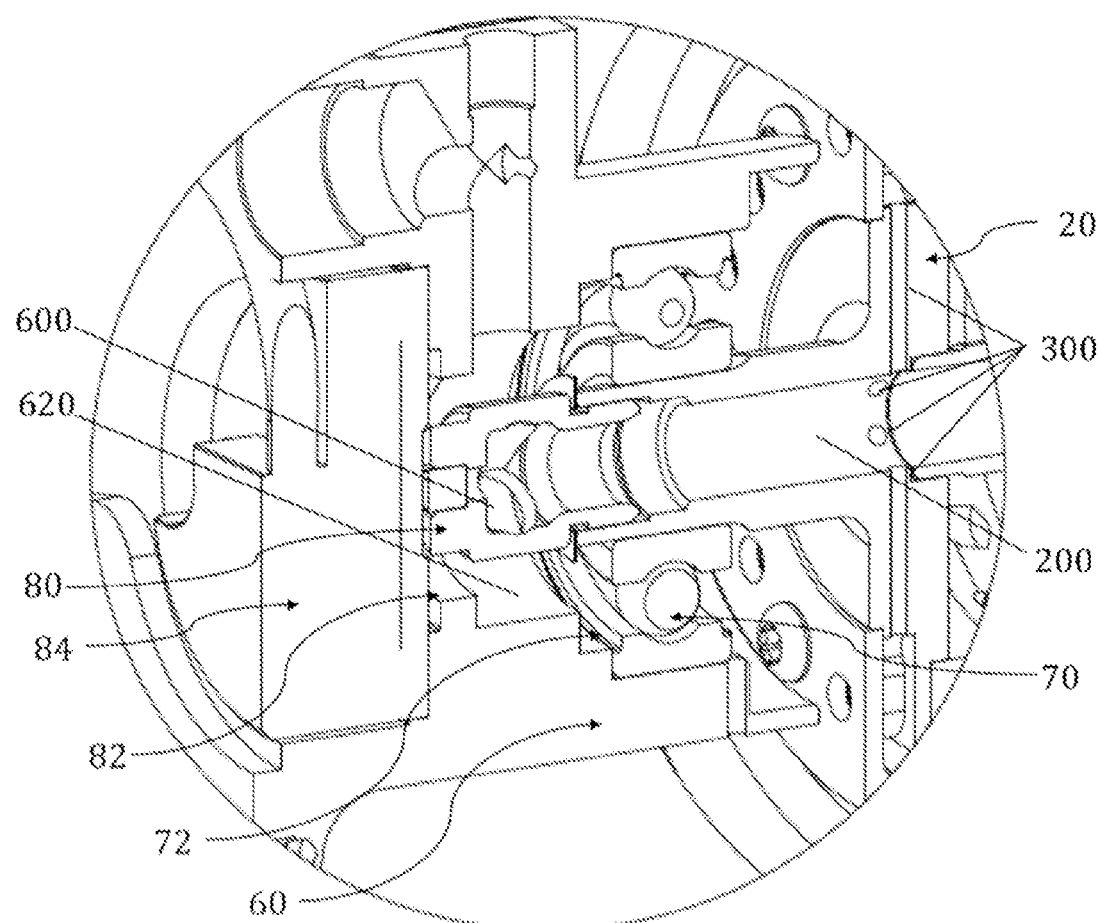
FIGS. 7A and 7B are a schematic representation of the encoder placement relative to the inlet and a schematic representation of a shaft plug, configured to hold a first embodiment of an encoder, including inlets, respectively.

As shown in FIG. 1, the shaft channel 200 of the cooling system 100 functions to distribute working fluid throughout the length of the rotor 24, and is fluidly coupled to the radial channels 300. The shaft channel 200 preferably extends through a length of the shaft interior. More preferably, the shaft channel 200 extends coaxially through a length of the shaft 22, such that the central axis of the shaft channel 200 is the rotation axis of the shaft. The shaft 22 preferably includes a single shaft channel 200, but may alternatively include multiple shaft channels, wherein the channels are preferably evenly distributed about the central axis of the shaft 22. The shaft channel 200 is preferably a smooth, circular channel, but may alternatively be textured on the interior surface or have different cross-sectional profiles. Examples of texturing in the shaft channel 200 include dimples, linear microchannels disposed along the length of the shaft channel 200, or helical microchannels disposed about the shaft channel 200. Examples of different cross-sectional profiles include an angled channel with two straight sides that meet a curved side (preferable if the radial channels 300 are located on the curved side, as this cross-sectional profile promotes flow to the curved side), a rectangular channel, a star-shaped channel, or any other channel cross-section. The shaft channel 200 is preferably a single channel extending through the central axis of the shaft 22, but may alternatively be multiple channels distributed about the central axis of the shaft 22 or a single channel through the central axis that splits into multiple channels disposed about the central axis. The shaft channel 200 preferably extends along the length of the rotor, and is preferably longer than the rotor (e.g. extends between the rotor ends 400), but may alternatively be shorter. The shaft channel 200 is preferably fluidly sealed on the end farthest from the inlet 600 to prevent undesired fluid egress from said end, and more preferably has both ends sealed. However, the shaft channel 200 may be open on both ends or be open on one end. The shaft channel 200 is preferably sealed by a plug, such as a rubber plug, bolt, or cap, but may alternatively be sealed during the machining of the shaft 22 or sealed by contact with another motor component. In one specific embodiment, the shaft channel 200 is sealed on the end proximal the encoder reader by a shaft plug configured to hold the encoder magnet (shown in FIG. 7), and on the end distal the encoder reader by a second shaft plug.

As shown in FIG. 1, the radial channels 300 of the cooling system 100 function to distribute working fluid to the rotor ends 400, and are fluidly coupled to the shaft channel 200. The radial channels 300 preferably extend radially from the shaft channel 200 through the shaft 22 to the shaft exterior. The radial channels 300 preferably terminate on the shaft exterior at a point along the rotor interior (e.g. halfway along the rotor length), but may terminate just outside the rotor ends 400, or at any suitable point on the shaft exterior. The radial channels 300 preferably extend perpendicularly from the shaft channel 200, but may alternatively extend from the shaft channel 200 at any suitable angle. The radial channels 300 are preferably straight channels, but may alternatively be wavy, helical, or any other configuration that promotes fluid flow from the shaft channel 200 to the shaft exterior. The radial channels 300 are preferably smooth, circular channels, but may alternatively be textured on the interior surface or have different cross-sectional profiles. Examples of texturing in the radial channels 300 include dimples, linear microchannels disposed along the length of the radial channel 300, or helical microchannels disposed about the interior of the radial channel 300. Examples of different cross-sectional profiles include an angled channel with two straight sides that meet a curved side, a rectangular channel, a star-shaped channel, or any other channel cross-section. The inlets and outlets of the radial channels 300 are preferably tapered to promote fluid ingress and/or egress out of the radial channel 300. However, the inlets and outlets may alternatively have convex corners, angled corners (e.g. the corner is a right angle), concave corners, or any other suitable transition. The motor preferably includes a plurality (e.g. two, three, four, etc.) of radial channels 300 distributed evenly about the shaft channel 200, but may alternatively include one or more radial channels 300 distributed evenly or unevenly about the shaft channel 200 (such that more radial channels 300 are on one side of the shaft channel 200 than the other). As shown in FIG. 5, the shaft preferably includes one set of radial channels 300 located substantially near the center of the rotor length, but may alternatively include two sets of radial channels 300, each located at a rotor end 400 (shown in FIG. 6), one set of radial channels 300 located proximal to one rotor end 400, or include any number of radial channels 300 located in any suitable configuration. The radial channels 300 of a set may be aligned, such that the central axes of the radial channels 300 intersect, or may be offset, such that the central axes of the radial channels 300 do not intersect.

Figure 3:
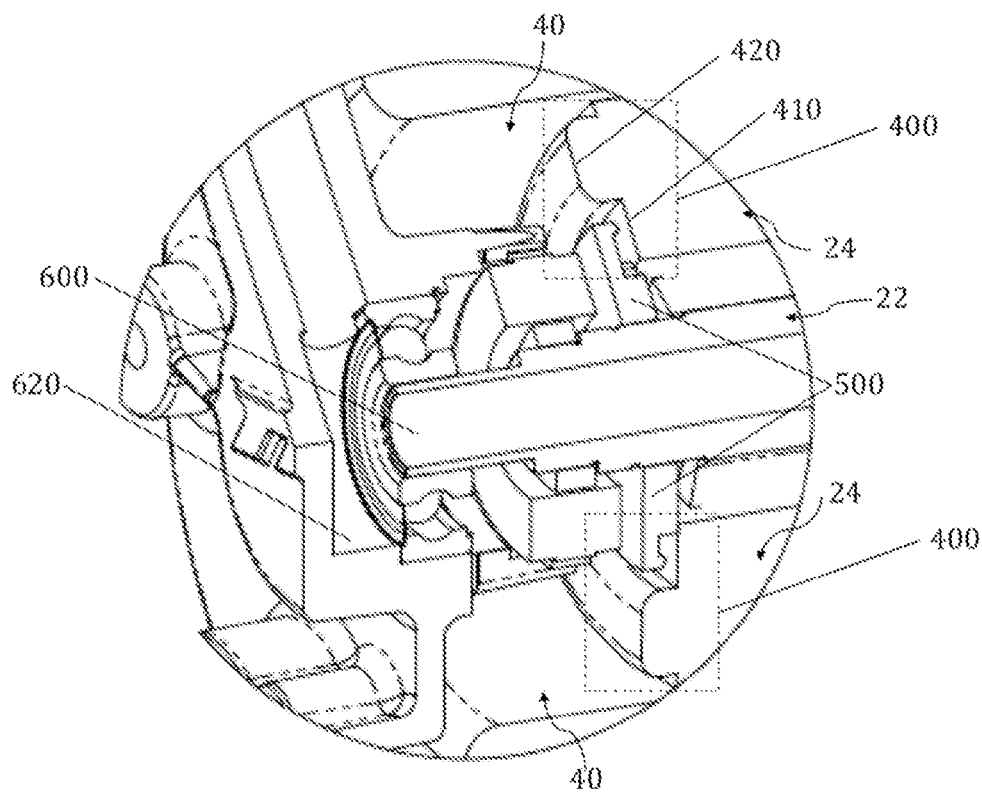
FIG. 3 is a detail view of the inlet section of the cooling system.

As shown in FIG. 1, the rotor end 400 of the cooling system 100 functions to disperse fluid to the adjacent stator coils 40, wherein fluid dispersion may additionally function to cool the end-piece and/or rotor windings. The rotor end 400 is preferably profiled to facilitate fluid dispersion onto adjacent stator coils. More specifically, the shape of the rotor end 400 is preferably tailored to generate the desired working fluid dispersion angle to the stator coils 42. For example, as shown in FIG. 3, the section of the rotor end 400 furthest from to the shaft 22 ("outer section" 420) preferably extends out further than the section of the rotor end 400 coupled to the shaft 22 ("inner section" 410), such that the outer section 420 overhangs the inner section 410. The rotor end 400 preferably has an ogee-like profile, such that the transition between the outer section 420 and the inner section 410 is concave, and the rotor end 400 is formed as an overhanging outer ring encircling a recessed inner ring. The outer section 420 is preferably curved, such that the flowing working fluid may track the curvature of the outer section 420 due to the Coanda effect as the working fluid is drawn up the rotor end 400 by centrifugal force. The profile of outer section 420 is preferably rectangular with rounded edges (as shown in FIGS. 1 and 3), but may alternatively be rectangular with angled edges, semicircular, or have any other suitable profile. Curvature of the outer section preferably refers to the curvature of the rounded edges, but may refer to the entire outer section profile. The radius of the outer section 420 is preferably approximately 5 mm from the outer section inside face (portion substantially parallel to the shaft) to the outer section end face (portion of the outside section with a normal vector parallel the rotor axis). In other words, the curvature of the outside section is preferably 1/5 mm. However, the curvature may be 1/1 nm, 1/1 mm, 1/100 mm, between 1/1 mm-1/50 mm, or any suitable curvature, with the corresponding radii being 1 nm, 1 mm, 100 mm, and 1-50 mm, respectively. The inner section 410 of the rotor end is preferably substantially flat, but may alternatively be angled outwards toward the outer section, be stepped towards the outer section, be concave, convex, or have any other suitable form. The transition between the inner section and the outer section is preferably concave, more preferably a right angle, but may alternatively be smooth, such as a flat plane connecting the two sections, or a smooth concave curve connecting the two sections. The rotor end profile preferably includes one transition, but may alternatively include multiple transitions, with one or more concentric transitional ridges or "steps" between the inner section 410 and the outer section 420, wherein each subsequent step closer to the outer section extends further out from the rotor than the previous step. However, the rotor end 400 may be substantially flat, wavy, or have any suitable profile. The surface of the rotor end 400 may be textured to promote fluid flow off the rotor end 400 onto other components of the motor (e.g., stator coils 40). The rotor end 400 may include linear channels that run from the inner section to the outer section, serpentine channels that run from the inner section to the outer section, dimples, or any other patterning or texture that promotes fluid flow from the inner section 410 to the outer section 420. The rotor end 400 is made of a thermally conductive material. The rotor end 400 is preferably made of copper, but may alternatively be composed of copper alloy, aluminum alloy, stainless steel, or any material that conducts or radiates heat. In one embodiment, the rotor end 400 is formed from the rotor steel end (which forms the inner section 410) and the corresponding rotor winding end-piece (which forms the outer section 420), wherein the end-piece 420 overhangs the rotor steel end 410 to form an ogee-like profile. However, the profiled rotor end 400 may be formed from a profiled rotor steel end, an end-piece that extends radially inward to couple to the rotor steel end, a separate piece coupled to the rotor end, or formed from any suitable configuration of the rotor end.

As shown in FIG. 1, the guide 500 of the cooling system 100 functions to direct the working fluid toward the adjacent rotor end 400. In doing so, the guide 500 additionally functions to prevent undesired working fluid dispersion off the shaft end (i.e. fluid flow parallel to the rotor axis). In operation, the guide 500 pools the working fluid flowing along the shaft 22 against the rotor end 400, such that the centrifugal force of the rotating rotor assembly 20 may draw the pooled fluid radially outward against the rotor end 400. The guide 500 may additionally function as a balancing mechanism, wherein the weight of the guide is tailored to balance the rotor during rotor rotation. For example, the mass of the guide may be changed (e.g. added or removed) to balance each individual motor to accommodate for manufacturing variation. The guide 500 is preferably a structure extending radially from the shaft 22, and is preferably disposed between the rotor end 400 and the shaft end. However, the guide 500 may alternatively be a structure directly coupling the radial channel exit to the rotor end 400, such as a flat or curved ramp, or be any other structure that directs fluid flow to the rotor end 400. The guide 500 is preferably disposed substantially proximal to the rotor end 400, such that the guide 500 is fluidly coupled to the rotor end 400 and working fluid pools between the guide 500 and the adjacent rotor end 400. The guide 500 preferably extends radially from the shaft 22, but may alternatively extend radially inwards from the rotor 24. The guide 500 is preferably a separate piece rigidly coupled to the shaft 22 (e.g. by a thermal or mechanical couple such as a weld, a screw, adhesive, a clip, etc.), but may alternatively be manufactured as a continuous piece with a shaft component, or as a piece of the rotor. The guide 500 is preferably a continuous ring encircling the shaft 22, but may include multiple sections, wherein each section correlates with a radial channel 300. The distance the guide 500 extends from the shaft 22 is preferably slightly shorter than the height of the transition (e.g. first step), such that the guide 500 nests underneath the outer section/end-piece 420. Alternatively, the guide may be substantially equivalent to the height of the transition between the inner section/rotor steel face 410 and the outer section/end-piece 420, be shorter or taller than the transition, may trace the rotor end profile, or have any other suitable shape, The face of the guide 500 proximal the radial channel openings and rotor end 400 ("proximal guide face") preferably includes features that prevent Coanda over the guide 500 (e.g. features that prevent fluid flow over the guide 500). In one embodiment, the proximal guide face is concave towards the rotor end 400 and radial channels 300, wherein the free edge of the guide proximal the rotor end 400 terminates in an angled corner. The angled corner is preferably sharp and has an angle of less than 45 degrees, but may alternatively have an angle of more than 45 degrees or an angle of 90 degrees or more. The proximal guide face may alternatively be flat, convex, wavy, or have any other suitable form. The surface of the proximal guide face is preferably smooth, but may alternatively be textured to prevent Coanda over the guide 500. Possible guide textures include concentric ridges parallel to the curved surface of the rotor 24, concentric channels parallel to the curved surface of the rotor 24, and dimples. The guide 500 is preferably made of aluminum, but may alternatively be made of copper, stainless steel, plastic or ceramic as well. The motor preferably includes two guides, with one coupled to each rotor end 400, but may include one guide, no guides, or multiple guides.

Figure 7B:
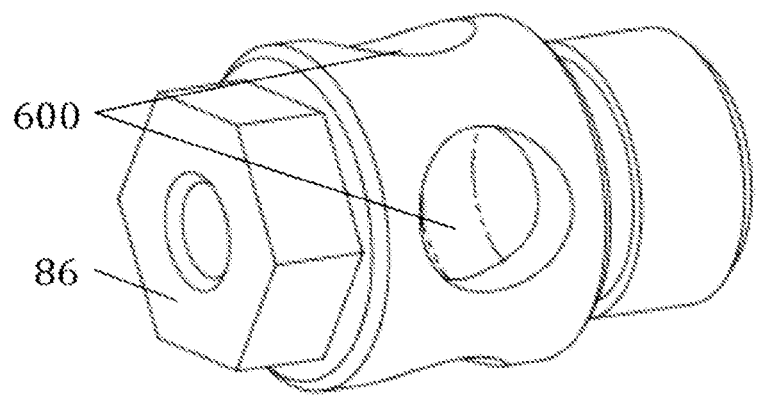

As shown in FIG. 1, the rotor assembly 20 may additionally include an inlet 600 that functions to allow working fluid ingress into the shaft 22. The inlet 600 is preferably fed by a fluid channel defined within a separate motor component (e.g. casing), but may alternatively be fed by a tube, wick, or any other suitable fluid transmission mechanism fluidly coupling the inlet 600 to a fluid reservoir. The inlet 600 is preferably an aperture in the shaft 22 that is fluidly coupled to the shaft channel 200, but may alternatively be an aperture in a component coupled to the shaft 22, such as the encoder, encoder magnet 86, component that holds the encoder, or plug that seals the shaft along another dimension (e.g. shaft plug, as shown in FIG. 7B). The inlet 600 is preferably located in the shaft 22. The inlet 600 is preferably located in the flat end of the shaft 22, but may alternatively be located along a radial portion of the shaft 22. In a first embodiment, the inlet 600 is a single aperture (hole) in the flat face of the shaft 22, wherein the inlet 600 is an extension of the shaft channel 200 through the shaft end. In this embodiment, the inlet 600 may have substantially the same radius as the shaft channel 200, or may have a larger or smaller radius. In a second embodiment, the inlet 600 is a radial aperture through the shaft 22, such that the inlet 600 meets both the curved surface of the shaft and the shaft channel 200 at a perpendicular junction. In this embodiment, the inlet 600 may originate from a radial surface of the shaft 22 or a radial surface of the rotor 24. This embodiment may additionally allow control over the rate of fluid ingress into the shaft channel 200. Since fluid is pulled into the shaft channel 200 only when the inlet 600 aligns with the fluid feed, and the frequency of inlet 600 alignment is directly related to the rate of rotor rotation, the rate of fluid ingress may be controlled by the number and configuration of the inlets 600 on the radial surface of the shaft 22, wherein the rate of fluid ingress is directly related to the rate of rotor rotation. In this embodiment, the shaft 22 preferably includes a plurality of inlets 600 (e.g. two, three, four, etc.) distributed evenly about the rotor central axis, but may alternatively include a single inlet or include multiple inlets distributed unevenly about the shaft 22. In a third embodiment, the inlet 600 is an angled aperture that meets the shaft channel 200 at an angled junction, wherein the inlet 600 may originate from the shaft end, the shaft radial surface, the rotor 24, or any suitable portion of the shaft 22. However, the inlet 600 may be any other suitable aperture that couples the shaft exterior to the shaft channel 200. The rotor assembly 20 preferably includes one or more inlets disposed on one end of the shaft 22, but may alternatively include inlets disposed on both ends of the shaft 22 or include inlets disposed along the length of the rotor 24. The inlet 600 is preferably unregulated (i.e. open), but may alternatively include a valve that regulates fluid ingress into the inlet 600. Examples of inlet valves include one-way valves, such as dome valves, leaf valves, and check valves; two-way valves; three-way valves, or any other suitable passive or active valve. The inlet valve is preferably located at the inlet 600, but may alternatively be located upstream (e.g. in the fluid channel that feeds the inlet 600) or downstream (e.g. in the shaft channel 200) from the inlet 600. The inlet 600 preferably has a smooth surface that is preferably polished or electro-polished, but may alternatively be textured to promote fluid ingress into the shaft 22. Possible inlet textures include dimples, linear microchannels disposed along the length of the inlet, or helical microchannels disposed around the interior surface of the inlet.

As shown in FIG. 3, the inlet 600 may additionally include an inlet block 620, disposed adjacent the inlet 600, that functions to facilitate fluid ingress into the inlet 600. The inlet block 620 preferably pools the working fluid near the inlet 600. In the first embodiment of the inlet 600, the inlet block 620 may provide a small reservoir with which the inlet 600 may align during the inlet rotation path to draw fluid into the inlet 600. In this inlet embodiment, the degree to which the inlet block 620 is filled may additionally function to control the fluid ingress rate into the shaft channel 200. For example, the inlet block 620 may be partially full, allowing each inlet 600 to draw fluid a portion of the rotation time, or the inlet block 620 may be entirely full, allowing all the inlets 600 to draw fluid constantly. In the second inlet embodiment, the inlet block 620 allows the fluid to reach the inlet/channel height. The inlet block 620 is preferably defined by one or more motor components adjacent the shaft 22. In a first embodiment, shown in FIG. 3, the inlet block 620 is defined by the motor casing 60 and a bearing seal 72 (e.g. a contact lip seal), wherein the bearing seal 72 seals the bearing 70, in which the rotor rotates, from fluid ingress. In a second embodiment, the inlet block 620 is defined by the motor casing 60 and the bearing 70, wherein the working fluid penetrates and lubricates the bearing during operation. In a third embodiment, shown in FIG. 7A, the inlet block 620 is defined on one side by an encoder component (e.g. encoder reader, encoder magnet, or encoder seal 82, such as an O-ring), defined on the opposing side by the bearing seal 72, and defined on the remaining sides by the motor casing 60. However, the inlet block 620 may be defined by any other suitable motor component. The inlet block 620 is preferably a substantially rectangular orifice, but may alternatively be a circular orifice, prismatic orifice, an orifice with an angled floor, or have any other suitable shape or configuration.

Figure 5A:
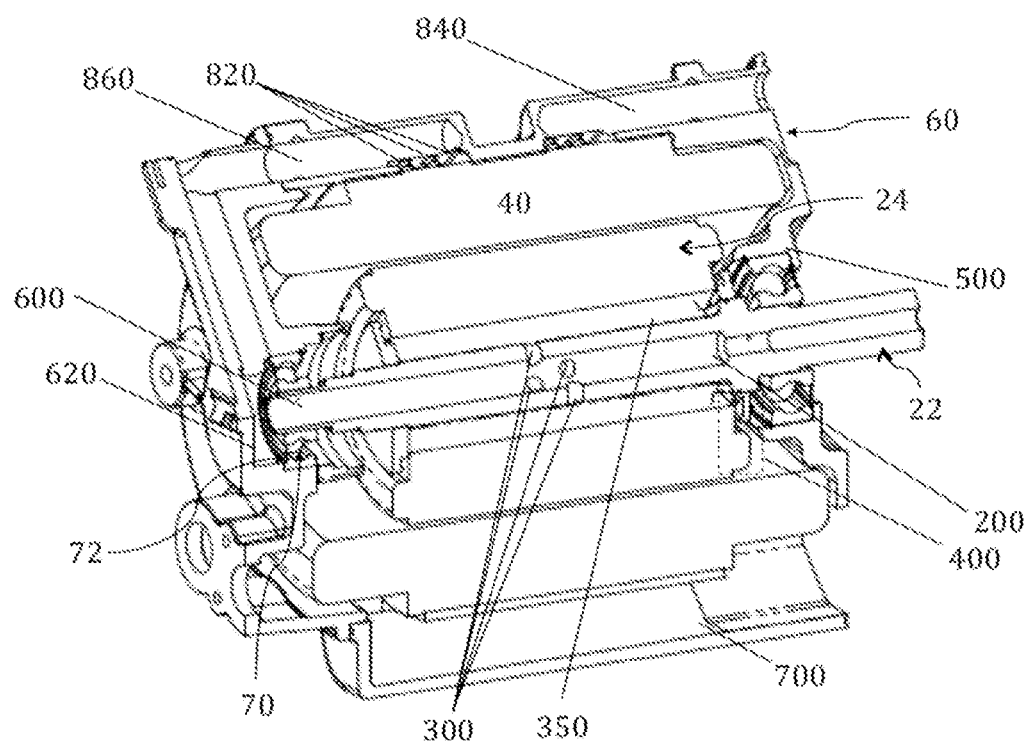
FIGS. 5A and 5B are a perspective view of a first embodiment of the cooling system, and a schematic representation of a cooling path through the first cooling system embodiment, respectively.
Figure 5B:
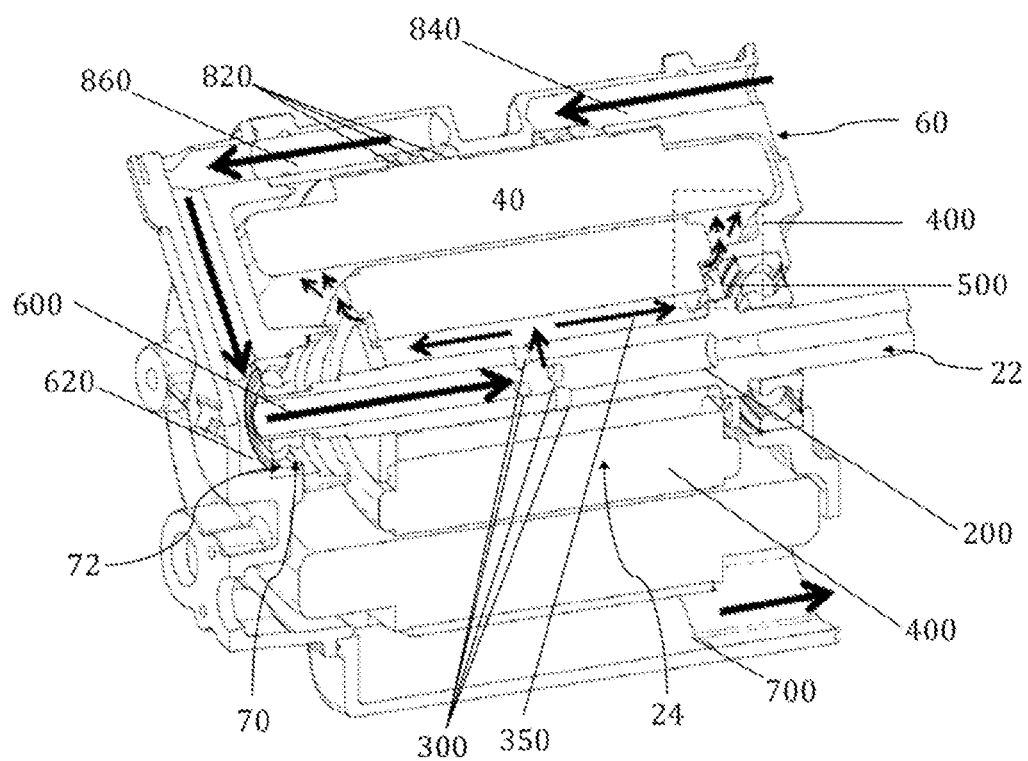
Figure 6B:
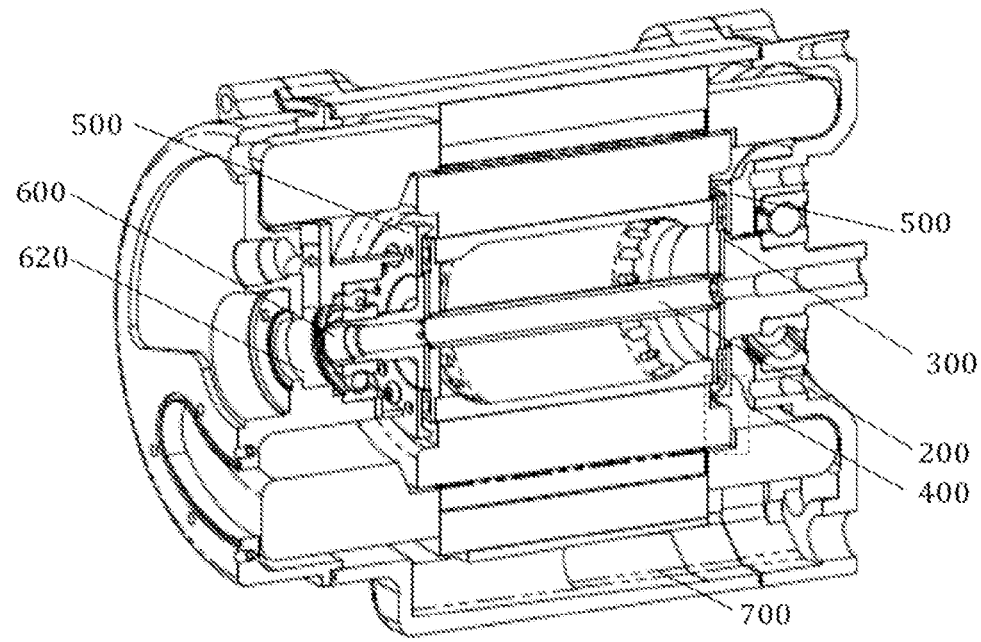

As shown in FIGS. 5B and 6B, the inlet 600 is preferably fed by a fluid channel (feeder channel) defined within a motor component (such as the motor casing, a bearing, or an encoder 80 coupled to the shaft 22), such that the fluid channel extends through the motor component and any other elements to fluidly couple with the inlet 600. Furthermore, the motor may include a plurality of fluid channels located in the aforementioned motor components, wherein the fluid channels are preferably fluidly coupled to each other, but may be fluidly coupled to a portion of the other channels or only to the inlet 600.

The cooling system 100 may additionally include one or more interior channels 350 that function to direct working fluid flow along the rotor interior. Directing fluid flow through the rotor interior functions to cool the rotor interior, and may function to cool the rotor body. The interior channel 350 is preferably in fluid communication with the radial channels 300, and functions to fluidly couple the radial channels 300 to the rotor end 400. More specifically, the inlet of the interior channel 350 is preferably the radial channel outlet, and the interior channel 350 preferably terminates between the guide and the rotor end 400. However, the interior channel 350 may be fed from another fluid source, such as a tube or channel directly coupled to the interior channel 350, wherein the tube or channel originates from another portion of the motor (e.g. the motor casing). The rotor assembly preferably includes multiple interior channels 350 evenly distributed throughout the rotor interior, but may alternatively include one interior channel 350 that traverses the rotor interior. The interior channel 350 preferably extends along the rotor length, preferably from one rotor end to the other (e.g. from one guide/rotor end pair to another) but may alternatively extend along a portion of the rotor length (e.g. half of the rotor length, a quarter of the rotor length), spiral about the central axis of the rotor, trace circular paths through the rotor (e.g. concentric with the rotor central axis), or have any other suitable configuration. In these embodiments, each interior channel 350 is preferably fed by one radial channel, but may alternatively be fed by multiple radial channels, or may be fed by a radial channel shared by multiple interior channels 350. Alternatively, the interior channel 350 may extend radially through the rotor, more preferably through a significant portion of the rotor thickness. In this embodiment, the inlet of the interior channel 350 is preferably aligned with the outlet of a radial channel, but may alternatively be offset. The interior channels may terminate at the exterior surface of the rotor, and may disperse working fluid to the stator interior surface. The interior channels 350 are preferably cooperatively formed by the shaft 22 and the rotor interior surface (rotor steel), wherein the interior channels are created when the rotor 24 is assembled to the shaft 22 (as shown in FIG. 4C). In this embodiment, the working fluid simultaneously contacts the shaft and the rotor interior/rotor steel. However, the interior channels 350 may be bored through the rotor, formed during the rotor manufacture (e.g. die cast), or be made in any other manner. In one specific embodiment, the rotor includes a plurality of linear interior channels 350 that extend the rotor length along the shaft exterior, from one guide to the other. The interior channels 350 are evenly distributed about the shaft circumference, and are each coupled to a radial channel. In a second embodiment, the shaft 22 includes a single boustrophedonic channel along its exterior, wherein the straight arms of the channel are substantially aligned parallel to the central axis of the rotor. The interior channel 350 is formed between the rotor interior surface and the shaft when they are assembled, In a third embodiment, the interior channel 350 is a single channel that spirals along the central axis of the rotor, wherein the flow path is fed by multiple radial channels extending through the shaft and into the rotor. This embodiment may additionally include a circular groove near the rotor ends 400, wherein the circular grooves assist in pooling the working fluid between the guide and the rotor end 400.

As shown in FIG. 1, the motor may further include a liquid collector 700 ("sump") that functions to collect the working fluid after the working fluid has cooled the stator coils 40. The liquid collector 700 is preferably disposed below the rotor assembly 20, such that dispersed working liquid falls into the liquid collector 700. However, the liquid collector 700 may be disposed above the rotor assembly 20 or anywhere relative to the rotor assembly 20 such that the dispersed working liquid may be collected within the liquid collector 700. The liquid collector 700 is preferably formed from the motor casing (e.g. the bottom of the motor casing), but may alternatively be a pan substantially the length of the motor. The liquid collector 700 preferably includes a base with angled walls to channel the working fluid to the base, but may alternatively include walls that are perpendicular to the liquid collector base, or not include a base at all, instead having angled walls that meet to form a channel. The liquid collector 700 preferably includes a fluid outlet to the exterior of the motor, but may alternatively be entirely contained within the motor, with no outlet to the motor exterior. The liquid collector 700 is preferably made of aluminum, but may alternatively be made of plastic, stainless steel, copper, or any alloy that can withstand the operating conditions of the motor. The liquid collector 700 may additionally function to cool the working fluid, and may incorporate fans, heat pipes, or configurations (e.g. the liquid collector 700 is exposed to ambient air) that extract heat from the working fluid. The liquid collector 700 may also function to recycle the working fluid back into the rotor assembly 20, and may additionally include a pumping system that pumps the working fluid from the liquid collector 700 to the inlet 600.

The motor may additionally include an auxiliary cooling mechanism that functions to cool portions of the motor other than the rotor assembly 20. The auxiliary cooling mechanism preferably cools motor components by utilizing the same working fluid as the cooling system 100, but may alternatively utilize a different working fluid. Furthermore, the auxiliary cooling mechanism is preferably fluidly coupled to and continuous with the cooling system 100, such that a single volume of fluid consecutively cools the components cooled by both the cooling system 100 and the cooling mechanism. Alternatively, the cooling mechanism may be an entirely separate flow path, be fed by the cooling system 100 working fluid, or be fed from the same fluid source as the cooling mechanism.

Figure 8A:
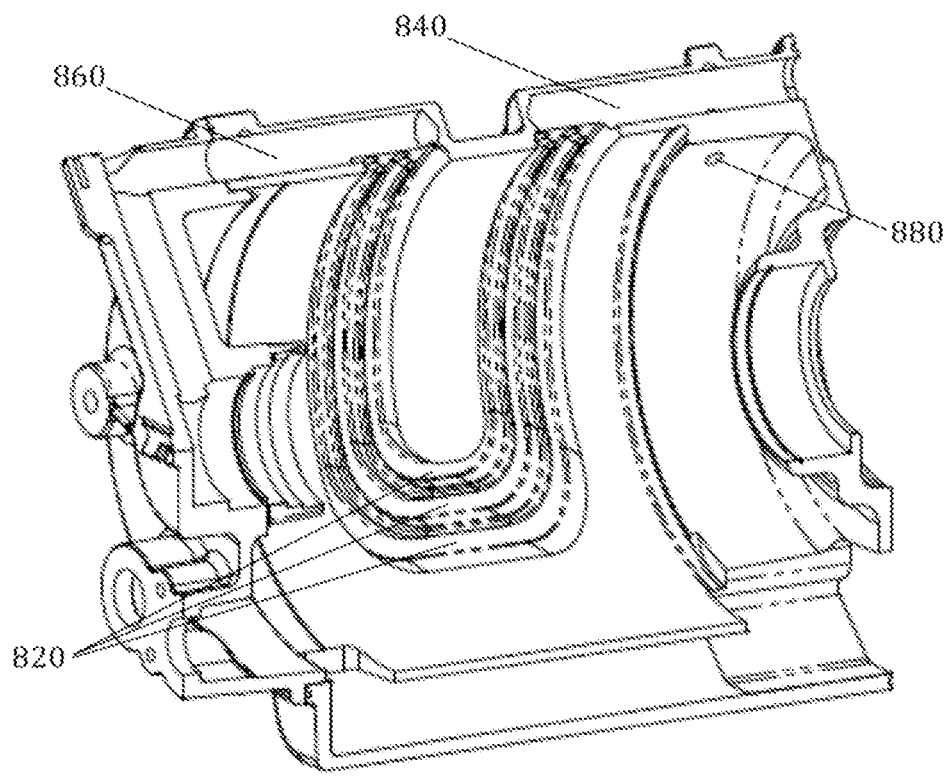
FIGS. 8A, 8B, and 8C are a schematic representation of an embodiment of the auxiliary cooling mechanism, a schematic representation of a cooling path through the auxiliary cooling mechanism, and a perspective view of the casing exterior, respectively.
Figure 8B:
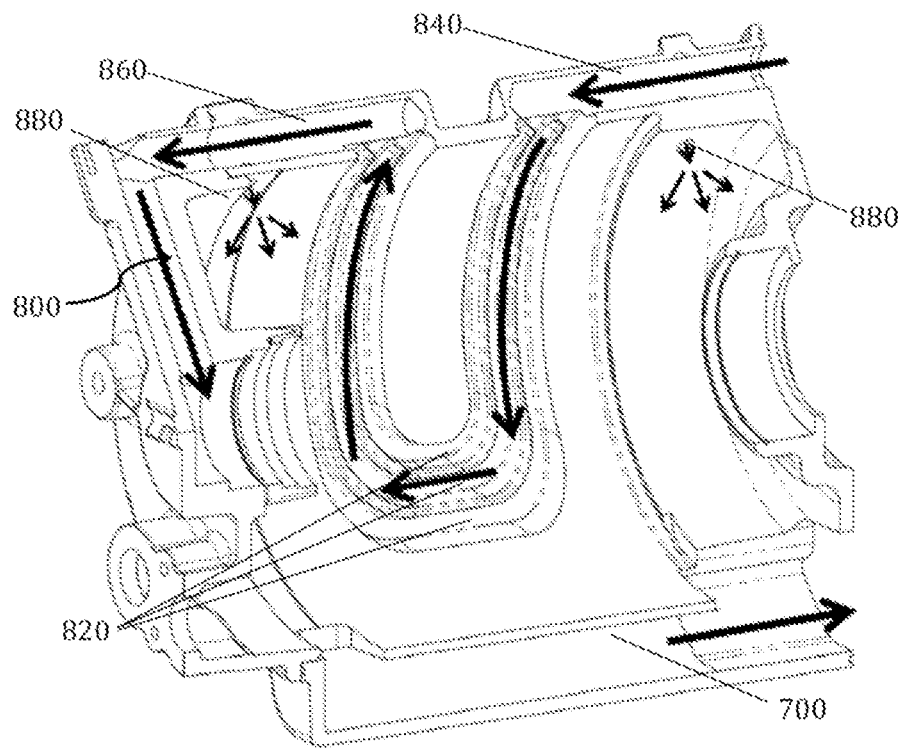
Figure 8C:
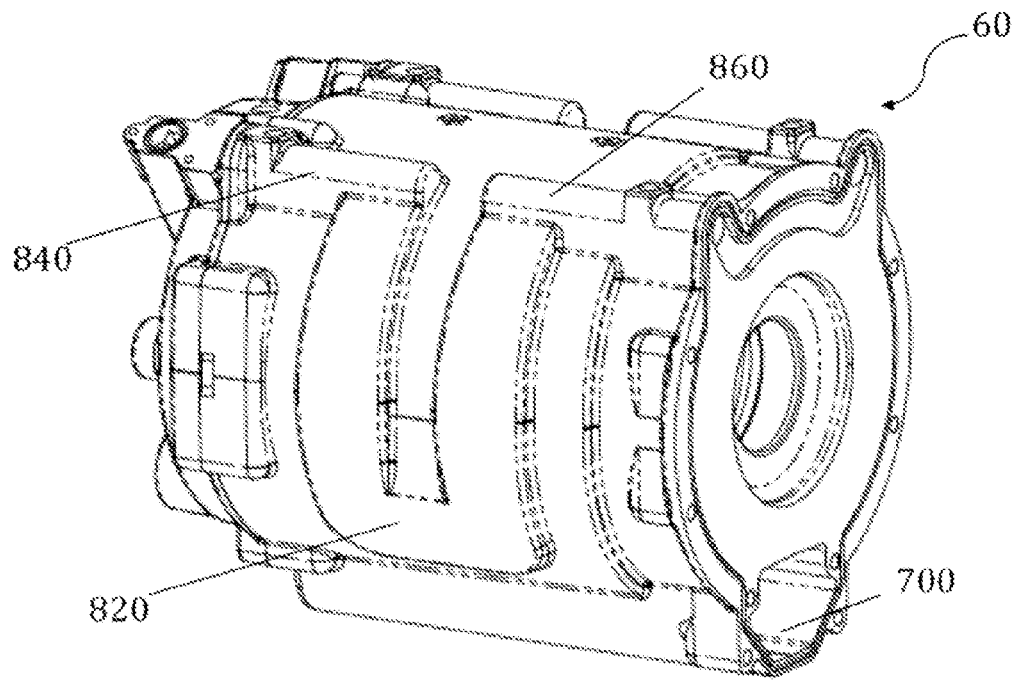

In a first embodiment, as shown in FIG. 8B, the auxiliary cooling mechanism is an auxiliary cooling path 800. The auxiliary cooling path 800 preferably cools the portion of the stator distal the rotor (stator outer surface), more preferably the outer stator coils 40, but may alternatively cool any other heat-generating component. The auxiliary cooling path 800 preferably traces a radial portion of the stator outer surface, but may alternatively trace a portion of the stator end face, traverse through the stator interior, traverse between the rotor end 400 and the stator 40, or have any other suitable flow path. As shown in FIG. 8A, the auxiliary cooling path 800 is preferably a series of parallel serpentine or boustrophedonic cooling channels 820 that trace the stator outer surface, wherein the arms of the channels 820 are preferably arcuate (e.g. bent) and not straight (i.e. parallel with the stator central axis), such that the arms trace an arc along the stator outer surface. However, the cooling channels 820 may alternatively be multiple channels that run parallel to the stator central axis, multiple parallel channels that trace arcs along the stator surface, a single boustrophedonic channel with arms that run parallel to the stator coil central axis, a single boustrophedonic channel with arms that trace arcs along the stator outer surface, a single straight channel, a single channel that spirals about the stator, multiple channels that spiral about the stator, or any other suitable cooling path. The multiple cooling channels 820 of the auxiliary cooling path 800 preferably originate from a common inlet manifold 840 fed by a general inlet, but may alternatively be individually fed by multiple auxiliary cooling channel inlets. The multiple cooling channels 820 of the auxiliary cooling path 800 preferably terminate in a common outlet manifold 860, wherein the outlet manifold 860 is preferably fluidly coupled to the inlet 600 of the cooling system 100. However, a portion of the cooling channels 820 may alternatively terminate in a first manifold and a second portion of the cooling channels 820 in a second manifold, wherein the first manifold is fluidly coupled to the cooling system inlet 600 and the second manifold is fluidly coupled to a second auxiliary cooling mechanism. The first and second manifolds are preferably aligned along the length of the motor and/or stator 40, and are preferably located substantially opposite the liquid collector 700 (e.g. substantially near the top of the motor). However, the manifolds may be located in any other suitable position and configuration within the motor casing 60. The first and second manifolds are preferably defined within the motor casing 60, but may alternatively be separate components that are coupled to the motor casing interior or exterior. The cooling channels 820 may alternatively terminate in the interior of the motor, such that the working fluid from the cooling channels falls into the liquid collector 700. In this embodiment, the cooling channels 820 preferably terminate in an area of the motor opposite the liquid collector 700 (e.g. substantially near the top of the motor), such that the working fluid may cool the motor components between the cooling channel outlets and the liquid collector 700. The cooling channels 820 are preferably circular tubes, but may alternatively semicircular, triangular, fan-shaped, or any suitable channel. The cooling channels 820 are preferably made of thermally conductive material, such as copper, aluminum, steel, metal alloy, or any other suitable material. The cooling channels 820 are preferably defined by the motor casing, more preferably by the portion of the motor casing directly surrounding the stator 40. More specifically, cooling channels are preferably formed between the stator exterior surface and the motor casing, such that the cooling fluid directly contacts the stator. However, the cooling channels may alternatively be fluidly isolated from the stator and encapsulated within the motor casing 60. In this embodiment, the motor casing is preferably made of a substantially conductive material, such as copper, aluminum, steel, metal alloy, metalized polymer, or any other suitable thermally conductive material. The motor casing is preferably in direct thermal contact with the stator 40 (e.g. touching the stator 40), and may include a thermal interface (e.g. thermal paste, thermal grease, etc) that facilitates heat transfer from the stator 40 to the cooling channels 820. However, the motor casing may alternatively be spaced a distance away from the stator 40, wherein radiation and convection (e.g. by the air within the motor) transfer heat from the stator 40 to the cooling channels 820. Alternatively, the cooling channels 820 may be a separate component mechanically coupled (e.g. welded, adhered, screwed onto, etc.) to the interior of the motor casing proximal the stator outer surface. The cooling channels 820 may alternatively be defined by the stator 40 or may be cooling tubes coupled to the stator 40. The cooling channels 820 may additionally function to cool the working fluid, and may incorporate fans, heat pipes, or configurations (e.g. the walls of the cooling channels 820 are exposed to ambient air, shown in FIG. 8C) that extract heat from the working fluid.

In a second embodiment, as shown in FIG. 8B, the auxiliary cooling mechanism includes a dispensing mechanism 880 that functions to dispense working fluid directly onto the motor component. The dispensing mechanism 880 is preferably a spray nozzle that sprays working fluid onto the motor component. However, the dispensing mechanism 880 may be a wick, open orifice, channel, or any other suitable mechanism that causes the working fluid to directly contact the motor component. Examples of the spray nozzle include aspirator nozzles, electrospray nozzles, inkjet nozzles (e.g. piezoelectric, continuous, etc.), plain orifice nozzles, shaped orifice nozzles, surface impingement nozzles, and swirl nozzles. The spray nozzle preferably forms an atomized spray, but may alternatively form a conical spray or any other suitable spray. The spray nozzle preferably forms a directed stream that is preferably directed at the motor component, but may alternatively form multiple directed streams. The dispensing mechanism 880 is preferably disposed proximal to the motor component. The dispensing mechanism 880 is preferably disposed above the motor component, such that the dispensed liquid falls onto the motor component, but may alternatively be disposed at an angle to the motor component or below the motor component, wherein the working fluid is dispensed at a high enough velocity (or pressure) for the fluid to reach the motor component. The dispensing mechanism 880 is preferably fed by the same fluid channel that feeds the cooling system inlet 600 (e.g. the dispensing mechanism 880 is arranged along the cooling system feed), but may alternatively be fed by a separate fluid channel. The dispensing mechanism 880 is preferably passively controlled (e.g. the pressure within the fluid channel to which it is coupled controls the rate of fluid flow), but may alternatively be actively controlled by a processor. The fluid channel that feeds the dispensing mechanism 880 preferably does not include valves, but may alternatively include passive and/or active valves similar to those described above.

The cooling system 100 may additionally include a displacement mechanism that functions to move fluid from one area of the cooling system 100 to another. More specifically, the displacement mechanism is placed within the cooling path and moves working fluid from the liquid reservoir to the inlet 600. The liquid reservoir is preferably the liquid collector 700, but may alternatively be a liquid reservoir exterior and/or remote from the motor. The displacement mechanism is preferably a pump, wherein the pump generates a pressure differential that causes fluid to move. The generated pressure is preferably high enough to push fluid through the entire cooling system 100, but may alternatively be lower (e.g. wherein the centrifugal force generated by the motor drives fluid flow). However, the displacement mechanism may be a wick, an electro-osmosis pump, or any other suitable displacement mechanism. The pump is preferably a constant pressure pump, but may be a displacement pump, a direct lift pump, or a gravity pump. Examples of pumps that may be used include positive displacement pumps (gear pump, peristaltic pump, vane pump, diaphragm pump), impulse pumps, and velocity pumps, but may alternatively include any other suitable pump Examples of the Cooling System In a first embodiment of the cooling system 100, as shown in FIG. 5A, the cooling system includes a shaft 22 including a shaft channel 200 extending concentrically through the shaft 22, an inlet in the shaft end face, a set of radial channels 300 that terminate substantially near the center of the rotor; and a rotor coupled to the shaft, wherein the rotor ends 400 have ogee-like profiles, with end-pieces 420 that overhang both the rotor steel ends 410. The rotor assembly further includes two guides 500, each nested against a rotor end 400, wherein the guide 500 is a substantially continuous ring extending radially from the shaft 22. The cooling system further includes a plurality of linear interior channels 350 fluidly coupling the radial channels 300 to the rotor ends 400, wherein the flow paths 350 extend along the rotor length and are substantially evenly distributed about the shaft circumference. The interior channels 350 are preferably defined between the shaft 22 and the rotor interior surface. The broad face of the guide 500 proximal to the rotor end 400 is concave and terminates in a sharp corner. The cooling system 100 further includes a liquid collector 700 located below the stator 40. In operation, as shown in FIG. 5B, working fluid flows into the shaft channel 200 through the shaft end, cooling the shaft, then flows out the radial channels 300 and into the internal flow paths 350 between the shaft-rotor interface, directly cooling the rotor interior. The working fluid then flows through the interior channels 350 towards the rotor ends 400, where the guides 500 pool the working fluid against the rotor ends 400. The centrifugal force of the spinning rotor assembly 20 pulls the working fluid radially up the rotor end 400. The working fluid tracks the substantially flat face of the rotor steel end, pools at the concave transition of the ogee (the interface between the rotor steel face and the end-piece), and centrifugal force pulls the working fluid over the convex end-piece. The working fluid tracks a portion of the end-piece due to the Coanda effect, and is dispersed onto the stator coils 40 as the Coanda effect lessens. The working fluid then falls into the liquid collector 700, and may be pumped back into the cooling system inlet 600.

In a second embodiment, the cooling system 100 is substantially similar to the first embodiment, and further includes an auxiliary cooling mechanism. The auxiliary cooling mechanism pre-cools the stator 40 with a volume of fluid, then channels the fluid to the inlet 600 of the cooling system 100. The auxiliary cooling mechanism preferably includes a plurality of nested boustrophedonic cooling channels, defined between the motor casing 60 and stator 40, that trace an arcuate segment of the stator circumference (preferably a major segment, such as ¾ of the circumference, ½ of the circumference, etc. but alternatively a minor segment). The cooling channels 820 preferably traverse the length of the stator, but may alternatively traverse only a portion of the stator length. The cooling channels are fed by a common inlet manifold 840, which is fed, in turn, by a motor casing inlet. The cooling channels terminate in a common outlet manifold 860 fluidly coupled to the cooling system inlet 600 by a fluid channel. The inlet and outlet manifolds (840, 860) are preferably located near stator areas that generate large amounts of heat, and are preferably thermally conductive.

In a third embodiment, the cooling system 100 is substantially similar to the second embodiment except that it includes dispersion mechanisms in addition to the cooling channels. In particular, the inlet manifold 840 and outlet manifold 860 each additionally feed one or more dispersion mechanisms, wherein a portion of the working fluid is sprayed directly onto the stator 40. More preferably, the dispersion mechanisms extend from the walls of the inlet and outlet manifold (840, 860), such the dispersion mechanisms are directly fed by the manifolds. The inlet and outlet manifold (840,860) are aligned along the top of the stator 40, substantially opposite the liquid collector 700, wherein the dispersion mechanisms are also located above the stator 40. In operation, fluid is pumped into the inlet manifold 840, wherein a portion of the fluid is sprayed onto a first end of the stator 40 and the rest is channeled through the cooling channels, thereby cooling the external radial surface of the stator 40. The fluid is then channeled from the cooling channels 820 to the outlet manifold 860, wherein a portion of the fluid is sprayed onto the second end of the stator 40 and the rest is channeled to the inlet of the cooling system 100, wherein the cooling system 100 consecutively cools the shaft interior, rotor interior, and stator coils 40. The portions of the stator 40 cooled by the dispersion mechanisms and the cooling system 100 are preferably different; the cooling system 100 preferably cools the inner radial surface of the stator 40, while the dispersion mechanisms preferably cool the outer radial surface of the stator 40.

Figure 6B:
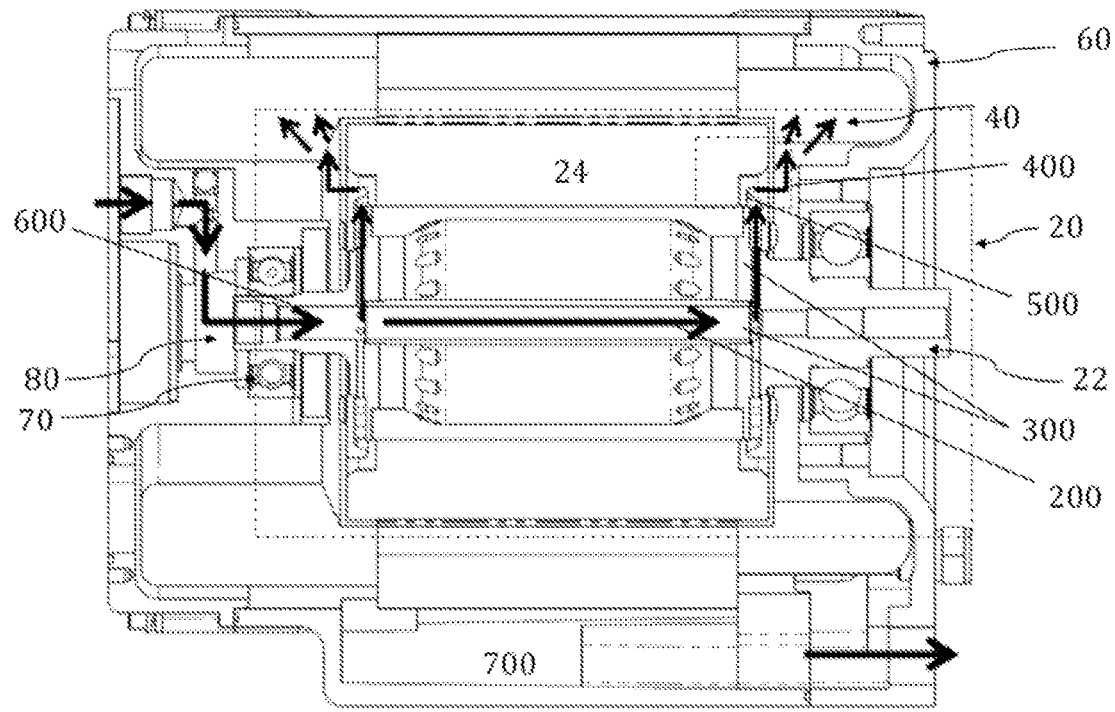

In a fourth embodiment, as shown in FIG. 6, the cooling system 100 includes a rotor assembly including shaft 22 with a shaft channel 200 and two sets of radial channels 300, each terminating on the shaft exterior just outside a rotor end 400; a set of inlets 600 disposed on the radial surface of a shaft end; a rotor 24 rigidly coupled to the shaft 22, the rotor 24 including rotor ends 400 with ogee-like profiles (e.g. the end-piece overhangs the rotor steel end face); and a guide 500, extending radially from the shaft, that is nested against the rotor end 400 under the outer section of the rotor end 420. The guide is located between the shaft end and rotor end 400, and fluidly couples to the radial channel outlet. The cooling system 100 additionally includes an inlet block 620 that pools the working fluid near the inlets 600. Each set of radial channels 300 preferably couple with the respective rotor end 400 and guide 500 on the exterior of the shaft, such that the radial channels 300 are located between the two aforementioned elements. The coupling junctions between the radial channels 300, rotor end 400 and guide 500 are preferably tapered to promote fluid egress out of the radial channel 300, but the junctions may alternatively be convex or have rounded corners. The guide 500 preferably curves partially over the radial channel 300, but may alternatively curve entirely over the radial channel 300 or not curve over the radial channel 300 at all. In operation, as shown in FIG. 6B, working fluid is pumped to the inlet block 620, pools in the inlet block 620, flows into the shaft channel 200, and flows out through the radial channels 300 directly to the rotor ends 400. The guide 500 maintains the working fluid against the rotor end 400, wherein centrifugal force draws the fluid up the substantially flat portion of the rotor steel face 410 and over the overhanging end-piece 420, wherein the Coanda effect causes the fluid to track the end-piece curvature. The fluid is dispersed to the adjacent stator coils 40 as the Coanda effect lessens, and the heated fluid falls into the liquid collector 700 from which it is pumped back to the inlet 600.

Method of Cooling a Motor

Figure 9A:
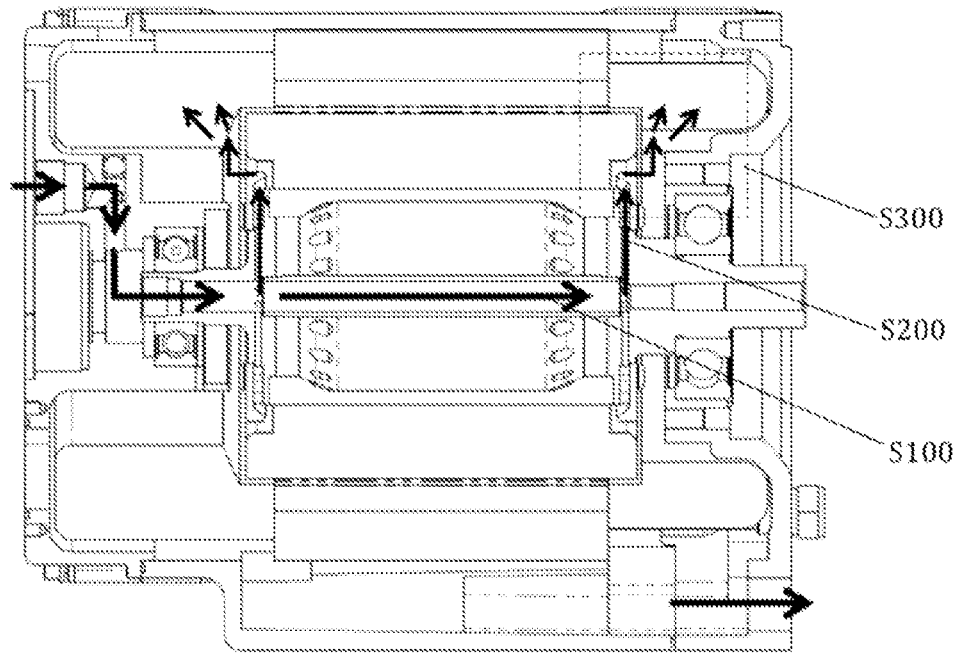
FIGS. 9A and 9B are a schematic representation of a first and second embodiment of the method of cooling a motor, respectively.
Figure 9B:
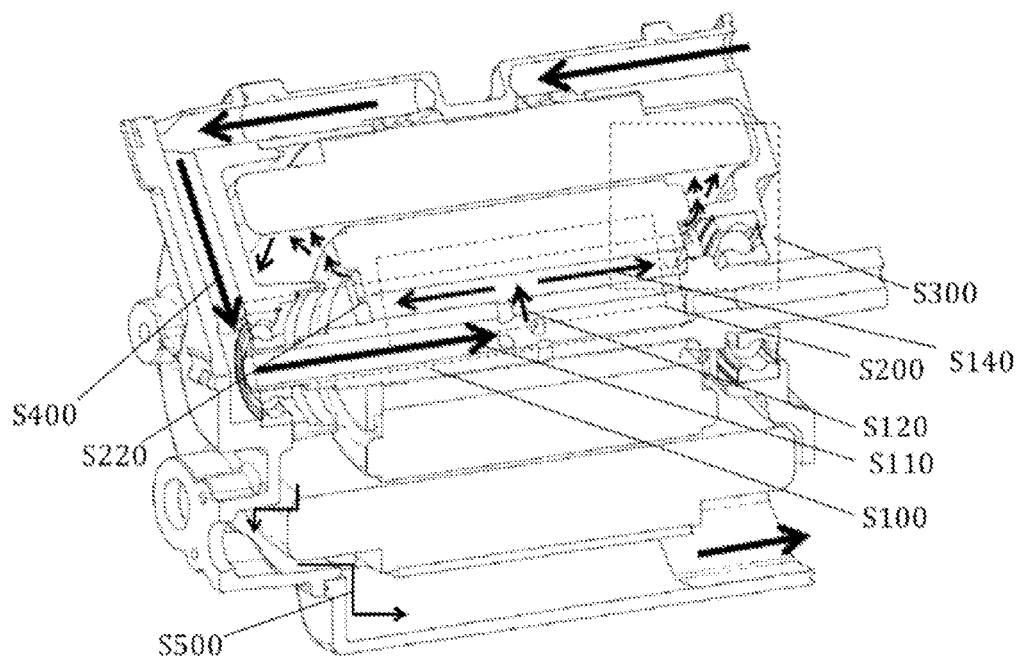

As shown in FIG. 9, The method of cooling an electric motor includes the steps of cooling the rotor assembly interior with the working fluid S100, channeling the working fluid to the rotor end S200, and dispersing the working fluid from the rotor end to the adjacent stator coils S400. This method is preferably utilized with the motor configuration described above, but may alternatively be used with any motor configuration including a shaft with a shaft channel and radial channels, a rotor with a profiled rotor end ("rotor end"), and a guide that directs fluid flow to the rotor end.

The step of cooling the rotor assembly interior S100 functions to cool the interior of the rotor assembly. This step preferably includes the step of flowing a working fluid through the shaft S110, which functions to cool the rotor shaft and to disperse the working fluid along a portion of the rotor length. The working fluid is preferably dispersed throughout the length of the shaft, but may alternatively be dispersed to only a portion of the shaft as well. The working fluid preferably flows through the length of the shaft channel due to a pressure differential generated by a displacement mechanism (e.g. a pump). Alternatively, the fluid may flow through the shaft channel due to the momentum imparted upon the fluid from the rotation of the rotor, but may additionally flow through the shaft channel due to various other effects such as capillary action, hydrophobic/hydrophilic interactions, or microfluidic interactions.

The step of cooling the rotor assembly interior may additionally include channeling the working fluid through the rotor interior, which functions to cool the rotor interior and may function to cool the rotor body as well. More preferably, this step preferably cools the shaft exterior and the rotor interior. This step is preferably accomplished by the sub-steps of: flowing the working fluid through the radial channels S120 and flowing the working fluid through the interior channels S140. This step is preferably accomplished by pumping the working fluid through the system. The centrifugal force imparted on the working fluid from the rotation of the rotor preferably aids fluid flow through these channels, such that rotation of the rotor, in cooperation with the pump-generated pressure, causes the working fluid to be expelled radially through the radial channels from the shaft channel. However, the working fluid may also be pulled through, wicked up, or directed through the radial channels and/or interior channels in any suitable manner. Sub-step S120 functions to flow the working fluid from the shaft channel into the interior channels. The radial channels preferably terminate at the shaft exterior, preferably near the center of the rotor but alternatively at the rotor ends or anywhere along the rotor body. The radial channels are preferably coupled to the interior channels along the body of each internal channel (e.g. substantially near the center, ¾ of the channel length, etc.). Sub-step S140 functions to cool the rotor interior. The interior channels are preferably defined between the shaft and the rotor interior surface, but may alternatively be defined within the rotor or defined along any suitable portion of the rotor interior. The interior channels preferably traverse through the length of the rotor, but may alternatively traverse radially through the rotor. The working fluid preferably flows along the rotor interior due to a pressure differential generated by a displacement mechanism (e.g. pump). Alternatively, the working fluid may flow through the rotor interior due to the momentum imparted upon the fluid from the rotation of the rotor, but may additionally flow along the rotor interior due to various other effects such as capillary action, hydrophobic/hydrophilic interactions, or microfluidic interactions.

The step of directing the working fluid from the rotor interior to a rotor end S200 functions to supply working fluid to the rotor end, such that the rotor end may be cooled. This step preferably includes the sub-step of channeling working fluid through the radial channels from the shaft channel S120. This step may additionally include the step of channeling the working fluid through internal channels S140, wherein the internal channels fluidly couple the radial channels to the rotor end and guide. This step preferably additionally includes the step of directing the working fluid against the rotor end with the guide S220. The guide preferably halts the progress of the working fluid along the shaft surface, and constrains the working fluid against the rotor end. More preferably, the guide creates a pool/reservoir of working fluid at the rotor end base. This step is preferably driven by the pressure generated from a pump, but may alternatively be driven by centrifugal forces, hydrophobic/hydrophilic interactions, or any other suitable driving force.

Figure 10:
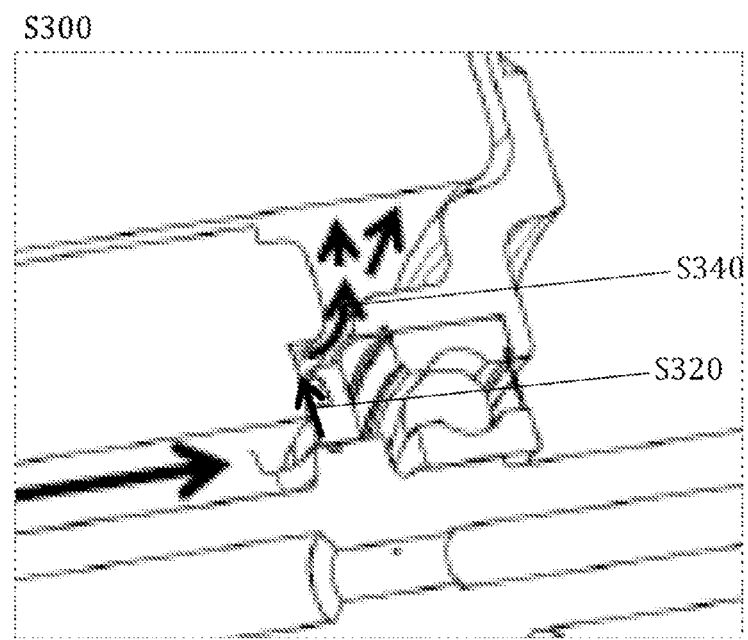
FIG. 10 is a schematic representation of the step of dispersing the working fluid onto the stator from the rotor exterior.

The step of dispersing the working fluid onto the stator from the rotor end S300 functions to cool the stator with the runoff from the rotor assembly interior, and also functions to cool the rotor ends. This step is preferably performed with a guide that directs the runoff to the proximal rotor end. However, this step may alternatively be accomplished by having auxiliary channels that lead to the stator, such that the working fluid flows through the auxiliary channels due to the working fluid's momentum, pressure differential (e.g. working fluid is pumped), or interaction with the channel walls (e.g. capillary action, hydrophobic or hydrophilic interactions). As shown in FIG. 10, this step preferably includes the sub-steps of drawing the working fluid up the rotor steel face S320 and dispersing the working fluid onto the stator coil with the end-piece S340. Drawing the working fluid up the rotor steel face S320 preferably includes leveraging the centrifugal force, generated by the rotating rotor assembly, to pull fluid up the substantially flat steel face. The working fluid is preferably drawn from the fluid pool created at the rotor end base by the guide. Dispersing the working fluid onto the stator coil with the end-piece S340 preferably generates a spray that lands on the surface of the stator coils. Sub-step S340 leverages the centrifugal force imparted by the rotation of the rotor and the Coanda effect, wherein the geometry of the rotor end preferably controls the angle and/or location of fluid dispersion onto the stator. As the fluid is drawn up the rotor end, the fluid tracks the convex end-piece due to the Coanda effect. Dispersion of the working fluid to the stator coils S340 preferably occurs when the Coanda effect on the working fluid lessens as the fluid travels along the end-piece. The curvature of the end-piece preferably controls the angle of dispersion, and is preferably tailored to obtain the desired angle of dispersion. The concavity of the transition between the end-piece and the rotor steel face preferably influences the amount of fluid dispersed to the stator, and may influence the size of the dispersion droplets. However, this sub-step S340 may additionally/alternatively be accomplished by leveraging the centrifugal force provided by the rotor, such that the momentum of the working fluid exiting the interior channel (imparted by the rotor rotation) causes the working fluid to flow along a portion of the rotor end. Step S300 may also be accomplished by pumping the working fluid into the rotor with enough pressure to expel the working fluid out of the radial channels and onto the rotor end, or by wicking the working fluid up the rotor end.

As shown in FIG. 9, the method may additionally include the step of introducing a working fluid to a rotor inlet S400, which functions to introduce working fluid (e.g. water or oil) into the shaft interior. This step is preferably accomplished by providing a continuous flow of working fluid directly to the inlet (e.g. by pumping it to the inlet), but may alternatively be accomplished by providing a continuous flow of working fluid to the inlet such that the working fluid pools in a holding area and rotation of the inlet relative to the pooled working fluid pulls working fluid into the inlet, or by including a seal disposed close to the inlet and opposite the stream such that the working fluid is forced into the inlet. Alternatively, working fluid can be provided periodically, and may be timed to coincide with the rotation of the rotor, such that working fluid is only provided when the inlet to the shaft channel is exposed to the working fluid stream.

As shown in FIG. 9, the method of cooling a motor may also include the additional step of collecting the working fluid S500. This step is preferably accomplished by providing a collector below the rotor and allowing the working fluid to fall onto the collector, but may alternatively be accomplished by allowing the working fluid to fall to the bottom of the motor casing. This step may also be accomplished by having deflectors disposed to interrupt the path of the working fluid flow and to channel the working fluid to a collector. The collector may be located inside or outside of the motor casing. The collector is preferably a tray, but may alternatively be a funnel, a trough, or anything that aggregates and controls the flow of a body of fluid. This step may additionally include the step of cooling the working fluid, which is preferably accomplished by having the collector exposed to ambient air, but may alternatively be accomplished by fanning the working fluid, drawing the heat out with heat pipes, circulating the working fluid, or any other method of cooling a fluid. This step may also include the additional step of recirculating the working fluid, wherein the fluid is pumped, drawn, or otherwise transferred to the inlet of the motor.

Figure 11:
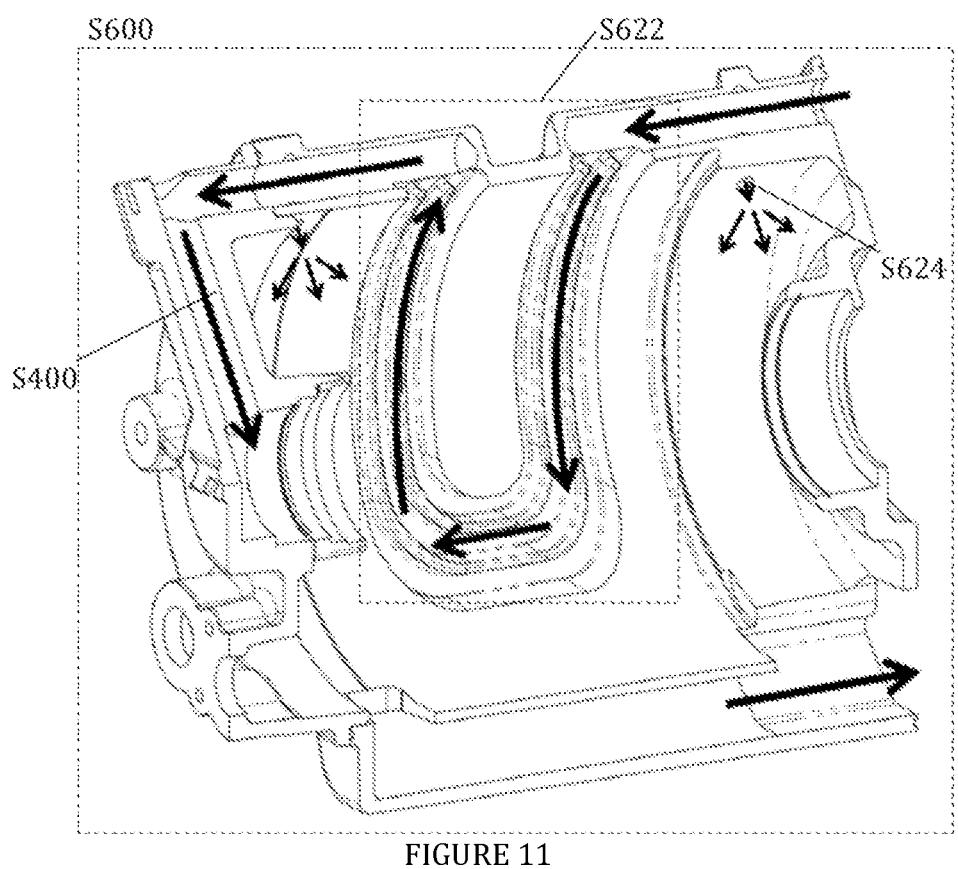
FIG. 11 is a schematic representation of cooling additional motor components with the working fluid.

As shown in FIG. 11, the method of cooling a motor may additionally include the step of cooling additional motor components with the working fluid Shoo. This step preferably precedes the step of cooling the rotor interior S100, wherein the fluid used to cool the additional motor components is used to cool the rotor interior. However, the step may follow the step of dispersing the cooling fluid onto the stator S300, wherein the runoff from the stator cools the additional motor component (e.g. the runoff falls onto the additional motor component). This step preferably includes the step of pre-cooling the stator with the working fluid S620, which functions to cool the portions of the stator not cooled by the runoff from the rotor exterior. However, other portions of the motor (bearings, bearing housing, encoder, etc.) may alternatively/additionally be cooled. The pre-cooling step S620 preferably occurs before the step of cooling the rotor interior S100. The pre-cooling step S620 preferably cools the radial surface of the stator distal the rotor, but may additionally cool the interior of the stator coils or any other suitable heat-generating portion of the stator. The pre-cooling step preferably includes the step of flowing the working fluid past a radial portion of the stator S622. The working fluid is preferably channeled through the portion of the motor casing proximal the stator radial surface, but may alternatively be channeled through the stator itself. The working fluid preferably contacts the stator, but may alternatively be fluidly isolated from the stator. The pre-cooling step may additionally/alternatively include the step of dispensing working fluid directly onto the stator coils S624. The working fluid is preferably sprayed onto the stator coils by a dispensing mechanism (e.g. a nozzle), but may alternatively be dispensed in any other manner. This step S624 preferably cools the stator coils, but may alternatively cool the flat face of the stator ends. In one specific embodiment, the step of pre-cooling the stator S620 includes flowing the working fluid past a radial portion of the stator, spraying a portion of the working fluid onto the stator coils, and channeling the rest of the working fluid to the rotor interior.

In a one preferred embodiment of a method of cooling a motor, step S100 includes pumping a working fluid into an inlet in the motor frame (S400) such that the working fluid flows: through the frame, through an inlet in an encoder magnet disposed in the shaft, and through an inlet in the shaft, wherein the working fluid pools in the shaft due to a seal disposed proximal the encoder magnet that prevents fluid from flowing past the encoder magnet. The pressure from the pumped fluid then drives the fluid through the shaft channel (S110), and forces the fluid out through the radial channels to the rotor interior (S110). The fluid flows along the rotor length through the rotor interior (S140) to a guide disposed on the exterior of the rotor. The guide constrains fluid flow and pools the fluid against a rotor end (S220). The centrifugal force from rotor rotation then drives the fluid up the rotor steel end to the end-piece (S320), wherein the working fluid draws heat from the rotor end and subsequently, the rotors during fluid flow. When the fluid reaches the end-piece, the centrifugal force disperses the working fluid to surrounding stator coils (S340), cooling them before falling to the liquid collector (S500).

In a second preferred embodiment, the method of cooling a motor is substantially similar to the first embodiment, except that the method further includes the step of pre-cooling the stator S620. The step of pre-cooling the stator includes the steps of flowing the working fluid within channels defined by the motor casing S622, wherein the channels are thermally coupled to a radial portion of the stator coils; spraying a portion of the working fluid onto the stator S624; and channeling the remnants of the working fluid to the rotor interior.

In a third preferred embodiment, the method of cooling the motor includes only S110, wherein working fluid is directed through the shaft interior (e.g. by pumping).

In a fourth preferred embodiment, the method of cooling the motor includes only S140, wherein the working fluid is directed directly into the interior channel(s) of the rotor (e.g. by pumping). The interior channels may have a common inlet and outlet manifold, or may be individually fed by multiple sources.

In a fifth preferred embodiment, the method of cooling the motor includes only flowing the working fluid over a radial portion of the stator exterior. More specifically, the method of cooling includes flowing the working fluid through cooling channels within the motor casing proximal the stator exterior (S622).

In a sixth preferred embodiment, the method of cooling the motor includes only S624, dispensing working fluid to the stator exterior through nozzles disposed along the cooling channels and/or channel manifolds.

In an seventh preferred embodiment, the method of cooling the motor is substantially similar to the fifth embodiment, and includes dispensing working fluid to the stator exterior through nozzles disposed along the cooling channels and/or channel manifolds (S624).

In a eighth preferred embodiment, the method of cooling the motor is substantially similar to the seventh embodiment and includes S300, dispersing the working fluid onto the stator from the rotor interior, wherein the fluid is preferably pumped to the rotor end (S320) and dispersed from the end-piece (S340).

In a ninth preferred embodiment, the method of cooling the motor is substantially similar to the seventh embodiment and includes S110, flowing the working fluid through the shaft interior, wherein the fluid is preferably pumped to the shaft channel inlet.

In an tenth preferred embodiment, the method of cooling the motor includes cooling the stator exterior by flowing working fluid through cooling channels in the motor casing proximal the stator exterior (S622) and channeling the fluid through the shaft interior (S110).

In a eleventh preferred embodiment, the method of cooling the motor includes cooling the stator exterior by flowing working fluid through cooling channels in the motor casing proximal the stator exterior (S622) and channeling the fluid through the rotor interior (S140), wherein the cooling channels fluidly couple to the interior channel(s).

In a twelfth preferred embodiment, the method of cooling the motor includes cooling the shaft interior by channeling the working fluid through the shaft channel (S110), channeling the working fluid to fluid dispensers, and cooling the stator exterior by dispensing working fluid to the stator exterior (S624).

In a thirteenth preferred embodiment, the method of cooling the motor includes cooling the rotors and stator by pumping the working fluid to the rotor end S320, drawing the working fluid up the rotor end, and dispersing the working fluid onto the stator coil with the rotor end S340. The working fluid is preferably simultaneously channeled to fluid dispensers to cool the stator exterior by dispensing working fluid to the stator exterior (S624).

In an fourteenth preferred embodiment, the method of cooling the motor includes only S300, dispersing the working fluid onto the stator from the rotor interior, wherein working fluid is provided to the rotor end by a feed external the rotor. In one specific embodiment, fluid is provided to the rotor end by a tube. In a second embodiment, the runoff from the stator coils (e.g. from S300 and/or S624) is intercepted and directed to a groove fluidly coupled to the rotor end.

As a person skilled in the art will recognize from the previous detailed description and from the figures and claims, modifications and changes can be made to the preferred embodiments of the invention without departing from the scope of this invention defined in the following claims.

We claim:

1. A system for cooling an electric motor comprising:
a stator comprising stator coils;
a motor casing encapsulating the stator, the motor casing cooperatively defining a fluid flow path with the stator, the fluid flow path extending along a portion of a stator length;
a rotor assembly arranged within the stator, the rotor assembly comprising:
a shaft comprising:
a shaft channel extending coaxially through a portion of the shaft, the shaft channel comprising an inlet fluidly connected to the fluid flow path, wherein the shaft channel is configured to receive a working fluid; and
a radial channel extending radially from and fluidly connected to the shaft channel, wherein the radial channel is configured to channel the working fluid from the shaft channel to the shaft exterior;
a rotor, rigidly coupled about the shaft, the rotor having a profiled rotor end that is configured to disperse working fluid from the shaft to the adjacent stator coils;
an interior channel defined between the rotor and the shaft exterior, the interior channel extending along a portion of the rotor length and fluidly connecting the radial channel and the rotor end;
a guide, extending from the shaft and arranged proximal the rotor end, cooperatively defining a fluid passage with the rotor end that is fluidly connected to the interior channel and configured to guide the working fluid against the rotor end, the fluid passage terminating in an opening fluidly connecting the fluid passage to a motor casing interior.

2. The system of claim 1, wherein the inlet is an extension of the shaft channel through the shaft end.

3. The system of claim 1, wherein the fluid flow path includes a fluid dispenser configured to dispense the working fluid on the stator coil surface distal the rotor.

4. The system of claim 3, wherein the fluid dispenser is a spray jet.

5. The system of claim 1, wherein the fluid flow path traces a portion of the stator radial surface.

6. The system of claim 1, wherein the fluid flow path comprises a plurality of nested boustrophedonic channels terminating in a common inlet and outlet manifold, wherein the outlet manifold is fluidly coupled to the inlet.

7. The system of claim 1, further including an interior channel, extending along a portion of the rotor interior, that is configured to receive the working fluid from the radial channel and to direct the working fluid to the rotor end.

8. The system of claim 1, wherein the shaft includes a plurality of radial channels arranged substantially evenly about the shaft circumference.

9. The system of claim 8, wherein the radial channels exit the shaft substantially near the rotor ends.

10. The system of claim 8, wherein the radial channels exit the shaft at a point substantially centered between the rotor ends.

11. The system of claim 10, wherein each radial channel is offset from another radial channel.

12. The system of claim 1, wherein the rotor end is profiled as an ogee, with a substantially flat inner radial portion transitioning into an overhanging convex outer radial portion, wherein the guide is nested underneath the outer radial portion.

13. The system of claim 12, wherein the guide is concave towards the rotor end.

14. The system of claim 13, wherein the angle of the guide edge proximal the rotor end and distal the shaft is acute.

15. The system of claim 12, wherein the inner radial portion is formed from a rotor steel end, and the outer radial portion is formed from a rotor winding end-piece.

16. The system of claim 11, wherein the system further includes a liquid collector configured to collect working fluid runoff.

* * * * *